(12) United States Patent
Nagase et al.

(10) Patent No.: US 11,796,458 B2
(45) Date of Patent: Oct. 24, 2023

(54) CONCENTRATION MEASUREMENT DEVICE

(71) Applicant: FUJIKIN INCORPORATED, Osaka (JP)

(72) Inventors: Masaaki Nagase, Osaka (JP); Kazuteru Tanaka, Osaka (JP); Masahiko Takimoto, Osaka (JP); Kouji Nishino, Osaka-shi (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 249 days.

(21) Appl. No.: 17/423,500

(22) PCT Filed: Jan. 21, 2020

(86) PCT No.: PCT/JP2020/001917
§ 371 (c)(1),
(2) Date: Jul. 16, 2021

(87) PCT Pub. No.: WO2020/158506
PCT Pub. Date: Aug. 6, 2020

(65) Prior Publication Data
US 2022/0074851 A1 Mar. 10, 2022

(30) Foreign Application Priority Data
Jan. 31, 2019 (JP) .................. 2019-016404

(51) Int. Cl.
*G01N 21/3504* (2014.01)

(52) U.S. Cl.
CPC ... *G01N 21/3504* (2013.01); *G01N 2201/062* (2013.01); *G01N 2201/1211* (2013.01); *G01N 2201/1218* (2013.01)

(58) Field of Classification Search
CPC ......... G01N 21/3504; G01N 2201/062; G01N 2201/1211; G01N 2201/1218
See application file for complete search history.

(56) References Cited

U.S. PATENT DOCUMENTS

2016/0084700 A1   3/2016   Nagase et al.
2019/0271636 A1   9/2019   Deguchi et al.

FOREIGN PATENT DOCUMENTS

JP   H07-103895 A   4/1995
JP   2002-139428 A   5/2002

(Continued)

*Primary Examiner* — Jamil Ahmed
(74) *Attorney, Agent, or Firm* — Studebaker & Brackett PC

(57) ABSTRACT

A Concentration measurement device 100 comprises: a measurement cell 4 having a flow path through which a gas flows, a light source 1 for generating incident light to the measurement cell, a photodetector 7 for detecting light emitted from the measurement cell, a pressure sensor 20 for detecting a pressure of the gas in the measurement cell, a temperature sensor 22 for detecting a temperature of the gas in the measurement cell, and an arithmetic circuit 8 for calculating a concentration of the gas based on an output P of the pressure sensor, an output T of the temperature sensor, an output I of the photodetector, and an extinction coefficient α, wherein the arithmetic circuit 8 is configured to calculate the concentration using the extinction coefficient α determined on the basis of the output of the temperature sensor 22.

5 Claims, 5 Drawing Sheets

(56) References Cited

FOREIGN PATENT DOCUMENTS

| | | | | |
|---|---|---|---|---|
| JP | 2002139428 A | * | 5/2002 | ............. G01N 21/33 |
| JP | 2011-163676 A | | 8/2011 | |
| JP | 2014-219294 A | | 11/2014 | |
| JP | 2018-025499 A | | 2/2018 | |
| WO | 2018/021311 A1 | | 2/2018 | |

* cited by examiner (a)

| | | LED peak wavelength (nm) | | |
|---|---|---|---|---|
| | | 297.5 | 300 | 302.5 |
| Cell TEMP (°C) | 100 | $MO_{A,L1,T1}$ | $MO_{A,L2,T1}$ | $MO_{A,L3,T1}$ |
| | 130 | $MO_{A,L1,T2}$ | $MO_{A,L2,T2}$ | $MO_{A,L3,T2}$ |
| | 150 | $MO_{A,L1,T3}$ | $MO_{A,L2,T3}$ | $MO_{A,L3,T3}$ |

(b)

CONCENTRATION MEASUREMENT DEVICE

TECHNICAL FIELD

The present invention relates to a concentration measurement device, and in particular, to a concentration measurement device for measuring a concentration of a gas in a measurement cell by detecting an intensity of light passed through the measurement cell.

BACKGROUND ART

Conventionally, a concentration measurement device (so called in-line type concentration measurement device) has been known, which is incorporated in the middle of a gas supply line for supplying an organometallic (MO) raw material gas etc. generated from a liquid material or a solid material to a semiconductor manufacturing equipment and is configured to measure a concentration of the gas flowing therein.

In this type of concentration measurement device, a light having a predetermined wavelength is made to enter from a light source through a light incident window into a measurement cell through which a measurement gas flows, and the light passing through the measurement cell is received by a light receiving element for measuring an absorbance. In addition, from the measured absorbance, the concentration of the measured gas can be determined according to Lambert-Beer law (for example, Patent Documents 1 to 3).

In the present specification, various transmitted light detection structures used for detecting the concentration of measurement gas are broadly referred to as measurement cells. The measurement cell includes not only a cell structure that is branched from a gas supply line and arranged separately, but also an in-line type transmitted light detection structure provided in the middle of the gas supply line as shown in Patent Documents 1 to 3.

PRIOR-ART DOCUMENT

Patent Documents

[Patent literature 1] Japanese Laid-Open Patent Publication No. 2014-219294
[Patent literature 2] International Patent Publication No. WO 2018/021311
[Patent literature 3] Japanese Laid-Open Patent Publication No. 2018-25499

SUMMARY OF INVENTION

Technical Problem

In order to measure the gas concentration in the measurement cell based on the absorbance, it is necessary to make light having a wavelength adapted to the absorbance characteristics of the gas enter the measurement cell. In addition, the concentration of the measured gas is obtained by calculation based on the Lambert-Beer equation using an extinction coefficient that is a coefficient indicating the easiness of the gas absorption. The extinction coefficient used at this time is obtained in advance before the concentration measurement and is corresponded to the type of gas and the wavelength of the measurement light.

However, according to experiments by the present inventors, it has been found that absorption characteristics may differ even for the same type of gas depending on the gas temperature in the measurement cell and the characteristic difference of each concentration measurement device (hereinafter referred to as "machine difference"), and in this case, the measurement accuracy may be lowered by using the conventional method.

The present invention has been made in view of the above-mentioned problem, and its main object is to provide a concentration measurement device having improved measuring accuracy.

Solution to Problem

The concentration measurement device according to an embodiment of the present invention includes a measurement cell having a flow path through which a gas flows, a light source for generating light incident to the measurement cell, a photodetector for detecting light emitted from the measurement cell, a pressure sensor for detecting a gas pressure in the measurement cell, a temperature sensor for detecting a gas temperature in the measurement cell, and an arithmetic circuit for calculating the gas concentration based on an output of the pressure sensor, an output of the temperature sensor, an output of the photodetector, and a plurality of extinction coefficients stored in advance in a memory, wherein the arithmetic circuit is configured to calculate a concentration using an extinction coefficient determined from the plurality of extinction coefficients based on the output of the temperature sensor.

In an embodiment, the arithmetic circuit is configured to calculate the concentration using an absorption coefficient determined on the basis of the output of the temperature sensor and a peak wavelength of measurement light emitted from the light source.

In an embodiment, the arithmetic circuit is configured to calculate the concentration using any of nine extinction coefficients corresponding to a combination of three temperatures and three peak wavelengths of the measurement light.

In an embodiment, the arithmetic circuit is configured to determine the gas concentration C based on the following equation by using a determined extinction coefficient $\alpha$, where $I_0$ is an intensity of the incident light entering into the measurement cell, I is an intensity of the light passing through the measurement cell. R is a gas constant, T is a gas temperature in the measurement cell, L is an optical path length of the measurement cell, P is a gas pressure in the measurement cell.

$$C=\ln(I_0/I)\times(R\cdot T)/(\alpha\cdot L\cdot P)$$

In an embodiment, the arithmetic circuit is configured to calculate the concentration by correcting the extinction coefficient of a reference gas using a correction factor set for each type of gas.

In an embodiment, the reference gas is acetone gas.

Effect of Invention

According to the embodiments of the present invention, it is possible to prevent accuracy deterioration caused by the gas temperature or the machine difference and perform concentration measurement more accurately.

DESCRIPTION OF EMBODIMENTS

Embodiments of the present invention will be described below with reference to the drawings, but the present invention is not limited to the following embodiments.

Figure 1:
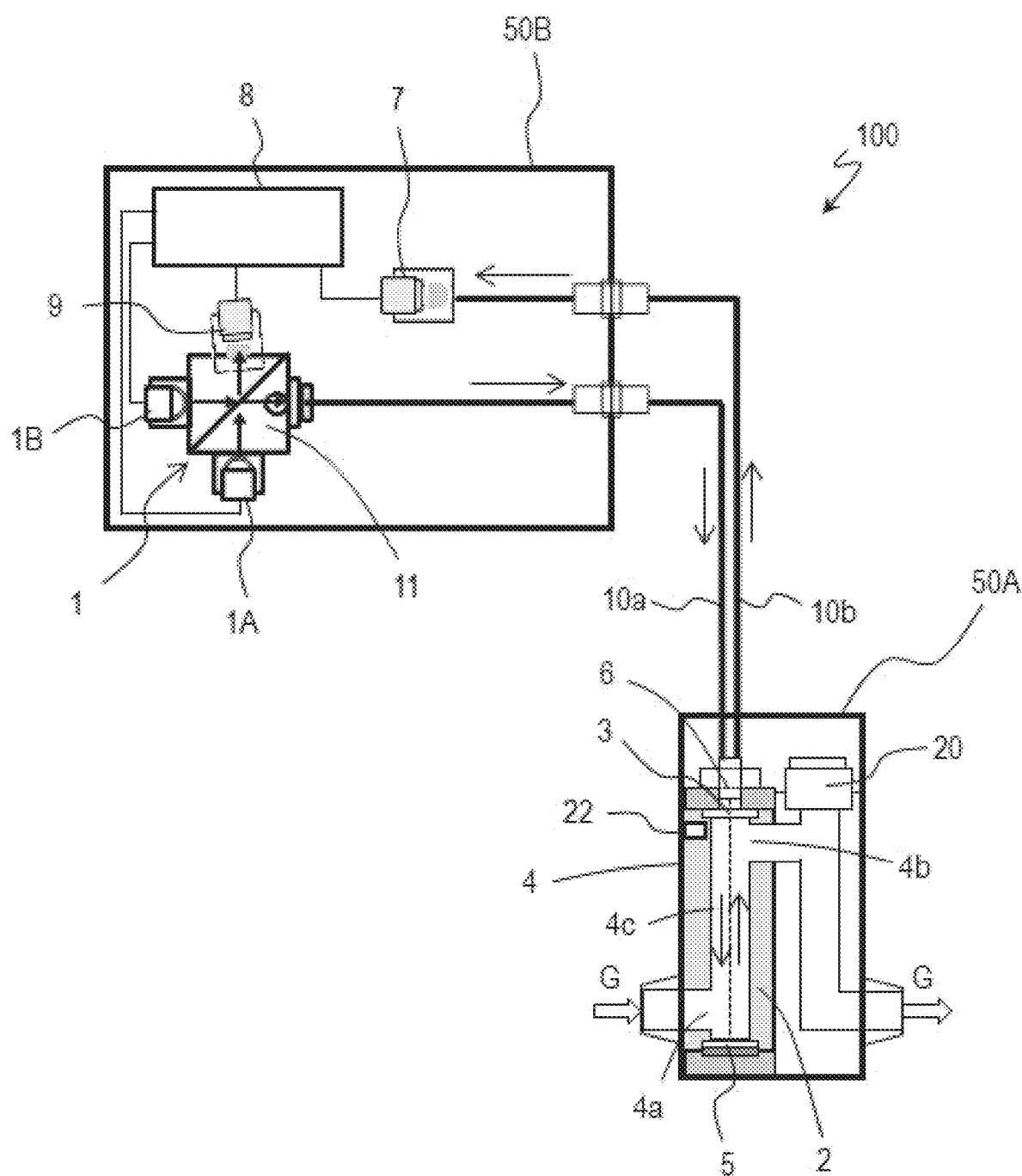
FIG. 1 is a schematic diagram showing an overall configuration of a concentration measurement device according to an embodiment of the present invention.

FIG. 1 is a diagram illustrating the overall configuration of the concentration measurement device 100 used in the embodiments of the present invention. The concentration measurement device 100 includes a gas unit 50A having a measurement cell 4 incorporated in a gas supply line, and an electric unit 50B having a light source 1 and an arithmetic circuit 8 spaced apart from the gas unit 50A. The gas unit 50A and the electric unit 50B are connected by optical fibers 10$a$, 10$b$, and a sensor cable (not shown).

The gas unit 50A may be heated to, for example, about 100° C. to 150° C. depending on the type of the measurement gas. However, the gas unit 50A is not necessarily used at a high temperature, when a gas at a normal temperature (room temperature) or a temperature lower than the normal temperature is used, the gas unit may be used in a condition that is not at a high temperature (not to be heated). Also, the electric unit 50B spaced apart from the gaseous unit 50A is typically maintained at room temperature. To the electric unit 50B, an external control device for transmitting an operation control signal to the concentration measurement device 100 or receiving a measurement concentration signal from the concentration measurement device 100 may be connected.

In the gas unit 50A, a measurement cell 4 having an inlet 4$a$ and an outlet 4$b$ of the measurement gas, and a flow path 4$c$ extending in the longitudinal direction is provided. Further, on one end portion of the measurement cell 4, a translucent window portion (here translucent plate) 3 is provided, and a reflecting member 5 is provided at another end of the measurement cell 4. In addition, in the present specification, the so-called light includes not only visible light but also at least infrared light and ultraviolet light, and it may include electromagnetic waves of any wavelength. Further, the translucency means that the internal transmittance in respect to the incident light to the measurement cell 4 is sufficiently high to be able to perform concentration measurement.

The window portion 3 of the measurement cell 4 is fixed to a cell main body 2 by a pressing member, and a collimator 6 connected to an optical fiber 10$a$ is attached to the pressing member. The collimator 6 can make the light from the light source 1 as parallel light incident on the measurement cell 4 and receive the reflected light from the reflecting member 5. The collimator 6 is preferably designed so that concentration measurement can be performed with high accuracy even when the gas to be measured flowing through the measurement cell 4 is at an elevated temperature.

The inlet 4$a$ and outlet 4$b$ of the measuring cell 4 are arranged on both sides of the flow path 4$c$ (left side and right side of the flow path 4$c$ in the drawing), when incorporated in the gas supply line, the gas unit 50A is configured to flow the gas in a horizontal direction as a whole. On the other hand, the flow path 4$c$ extends in a direction perpendicular to the entire flow direction in the gas supply line. In the present specification, such a configuration is referred to as a vertical measurement cell 4, when using the vertical measurement cell 4, it is possible to save space when incorporated in the gas supply line, and to obtain the advantage of easy maintenance. In addition, in the measurement cell 4 shown in the drawing, although the inlet 4$a$ is provided in the vicinity of the reflecting member 5, and the outlet 4$b$ is provided in the vicinity of the window portion 3, in another embodiment, the inlet 4$a$ may be provided in the vicinity of the window portion 3, and the outlet 4$b$ may be provided in the vicinity of the reflecting member 5. Further, the flow path 4$c$ is not always necessary to extend in the direction perpendicular to the entire flow direction.

As the window portion 3, sapphire is suitably used, because it is resistant to detection light such as ultraviolet light used for concentration measurement, has a high transmittance, and is mechanically and chemically stable, but other stable materials such as quartz glass may also be used. The cell main body 2 (the portion to define the flow path) of the measuring cell 4 is made of SUS316L, for example.

The reflective member 5 is fixed to the lower surface of the cell main body 2 by a pressing member. The reflecting surface of the reflecting member 5 is provided so as to be perpendicular to the traveling direction of the incident light or the central axis of the flow path.

The reflecting member 5, for example, may be configured to have an aluminum layer formed as a reflective layer by sputtering on a back surface of a sapphire plate. Further, the reflecting member 5 may include a dielectric multilayer film as the reflecting layer, by using the dielectric multilayer film, it is possible to selectively reflect light having a specific wavelength range (e.g., near-ultraviolet). The dielectric multilayer film is composed of a laminate of a plurality of optical coatings having different refractive indices (a laminate of a high refractive index thin film and a low refractive index thin film), by appropriately selecting the thickness and the refractive index of each layer, it is possible to reflect or transmit light of a specific wavelength.

Further, since the dielectric multilayer film is possible to reflect light at an arbitrary ratio, for example, when the incident light is reflected by the reflecting member 5, rather than 100% of the incident light, a portion (e.g., 10%) is made to transmit, by a light detector or the like installed at the lower portion of the reflecting member 5 (the surface opposite to the surface in contact with the flow path 4$c$), the transmitted light can be received and utilized as a reference light, it can also substitute the reference light detector 9.

Moreover, in the gas unit 50A of the present embodiment, a pressure sensor 20 for detecting the pressure of the measurement gas flowing through the measurement cell 4, and a temperature sensor 22 for measuring the temperature of the measurement gas are provided. The gas unit 50A is configured to be able to measure the pressure and temperature of the measurement gas during the concentration measurement.

Outputs of the pressure sensor 20 and temperature sensor 22 are input to the arithmetic circuit 8 of the electric unit 50B via a sensor cable (not shown). A plurality of temperature sensors 22 may be provided. As the temperature sensor 22, a thermistor, a thermocouple, or the like, may be used in addition to a temperature measurement resistor. As the pressure sensor 20, for example, a silicon single crystal sensor chip built-in type pressure sensor having a diaphragm to form a pressure sensing surface is used. The pressure sensor 20 and the temperature sensor 22 may be provided at any location as long as the pressure and temperature of the gas present in the flow path 4c in the measurement cell 4 can be measured.

On the other hand, in the electric unit 50B, a light source 1 for generating light incident to the measuring cell 4, a measuring photodetector 7 for receiving light emitted from the measuring cell 4, an arithmetic circuit 8 configured to calculate the concentration of the measurement gas based on a detection signal output of the measuring photodetector 7 (a signal corresponding to the intensity of the received light), and a reference photodetector 9 for receiving a reference light from the light source 1 are provided.

In the present embodiment, the light source 1 includes two light-emitting elements (LEDs in this case) 1A and 1B that emit ultraviolet light having wavelengths differing from each other. Using an oscillation circuit, driving currents of different frequencies are applied in the light-emitting elements 1A and 1B, by performing frequency analysis (e.g., fast Fourier transform or wavelet transform), it is possible to measure the intensity of light corresponding to each wavelength component from the detection signal detected by the measurement photodetector 7. As the light-emitting elements 1A and 1B, a light-emitting element other than LED, for example, an LD (laser diode) may also be used. Further, instead of using a multiplexed light of a plurality of different wavelengths as the light source, it is also possible to utilize a light source having a single wavelength, in this case, the multiplexer and the frequency analysis circuit can be omitted. Three or more light-emitting elements may be provided, and it may be configured to generate incident light using only one selected light-emitting element among those provided. A temperature measuring resistor may be attached to the light source 1. Furthermore, the light emitted by the light emitting element may be visible light or infrared light rather than ultraviolet light.

The light source 1 and the reference photodetector 9 are attached to a beam splitter 11. The beam splitter 11 functions to make a portion of the light from the light source 1 incident on the reference photodetector 9, and to guide the remaining light to the measurement cell 4. As the light-receiving element constituting the measurement photodetector 7 and the reference photodetector 9, for example, a photodiode or a phototransistor is preferably used.

The arithmetic circuit 8 is configured by, for example, a processor or a memory provided on a circuit board, includes a computer program for executing a predetermined calculation based on an input signal, and can be realized by a combination of hardware and software. Although the arithmetic circuit 8 in the illustrated embodiment is incorporated in the electric unit 50B, it is needless to say that a part of the component (such as a CPU) or all of it may be provided in a device outside of the electric unit 50B.

In the concentration measurement device 100, the light from the light source 1 is guided to the window portion 3 of the measurement cell 4 through the optical fiber 10a. Further, in the measurement cell 4, the light reflected by the reflecting member 5 is guided to the measurement photodetector 7 by the optical fiber 10b. In the present embodiment, the optical fiber 10a for guiding the light to the measurement cell 4 and the optical fiber 10b for guiding the light emitted from the measurement cell 4 are provided separately, thereby making it possible to reduce the influence of stray light.

However, in another embodiment, by using a single optical transmission member serving for both the incident light and the emitted light, such as an optical fiber bundle, the light source and the measuring photodetector may be connected to the measurement cell. A reflection type concentration measurement device using such a single light-transmitting member is disclosed in, for example, Patent Literature 2, and it is also possible to employ the same configuration in other embodiments of the present invention.

In the measurement cell 4 described above, the optical path length of the light reciprocating in the measurement cell 4 can be defined by twice the distance between the window portion 3 and the reflecting member 5. In the concentration measurement device 100, the light of the wavelength λ incident to the measuring cell 4 and then reflected by the reflecting member 5 is absorbed by the gas present in the flow path 4c in the measuring cell 4 in dependence on the concentration of the gas. Then, the arithmetic circuit 8 is able to measure the absorbance Aλ at the wavelength λ, by frequency analysis of the detected signal from the measurement photodetector 7, further, based on the Lambert-Beer law shown in the following equation (1), it is possible to calculate the molar concentration $C_M$ from the absorbance Aλ.

$$A\lambda = -\log_{10}(I/I_0) = \alpha' L C_M \qquad (1)$$

In the above equation (1). $I_0$ is the intensity of incident light on the measurement cell, I is the intensity of light passing through the gas in the measurement cell, α' is the molar extinction coefficient (m$^2$/mol), L is the optical path length (m) of the measurement cell, and $C_M$ is the molar concentration (mol/m$^3$). The molar extinction coefficient α' is a coefficient determined by substance. $I/I_0$, generally referred to as transmission, has an absorbance Aλ of 0 when the transmission $I/I_0$ is 100%, and the absorbance Aλ becomes infinity when the transmission $I/I_0$ is 0%.

In addition, regarding the incident light intensity $I_0$ in the above equation, when there is no absorbing gas in the measuring cell 4 (e.g., when a gas that does not absorb ultraviolet light is filled, or when it is vacuumed), the intensity of the light detected by the measuring photodetector 7 may be regarded as the incident light intensity $I_0$.

The optical path length L of the measurement cell 4, as described above, may be defined as twice the distance between the window portion 3 and the reflecting member 5, so that twice of the optical path length may be obtained as compared with the concentration measurement device provided with the light incident window and the light emitting window at each end of the measurement cell. Thus, in spite of the miniaturization, the measurement accuracy may also be improved. Further, in the concentration measurement device 100, since the incident and emitted light are made only on the window portion 3 side of the measurement cell 4, the number of parts may be reduced.

As described above, the concentration measuring device 100 is possible to determine the molar concentration $C_M$ of the gas by using the Lambert-Beer equation (1). However, in order to further improve the measuring accuracy, in the present embodiment, the molar concentration $C_M$ is obtained from the equation (1) using not only a single molar absorption coefficient α' set in advance, but also an absorption coefficient selected on the basis of the temperature output by the temperature sensor 22, and the concentration of the gas is also obtained by referring to the output of the temperature sensor 22 and the output of the pressure sensor 20. In addition, by storing the extinction coefficient in advance in the memory at the time of shipment before the concentration measurement is performed, the extinction coefficient can be read out from the memory and used at the time of performing the concentration measurement.

Hereinafter, in the present embodiment, a method of obtaining the extinction coefficient used for concentration calculation by flowing acetone gas having a known concentration will be described. In the following, light (specifically, near ultraviolet rays) having a predetermined wavelength absorbed corresponding to the concentration of the acetone gas is used as the light used for measurement, and the extinction coefficient corresponding to the wavelength is also obtained. In the case of acetone gas, the wavelength of the measurement light is set, for example, from 29% nm to 310 nm.

As described above, the following equation (1a) is satisfied from the Lambert-Beer equation (1). In equation (1a), as same as in the Lambert-Beer equation (1), $I_0$ is the incident light intensity, I is the transmitted light intensity, α is the molar extinction coefficient, L is the optical path length, and $C_M$ is the molar concentration of the gas (here, acetone) to be measured. This equation (1a) shows that when the optical path length is constant, the absorbance is proportional to the molar concentration, and the extinction coefficient α corresponds to the slope of the first order function indicating the relationship between the molar concentration and the absorbance (the easiness of the absorbance of the substance)

[Equation 1]

$$-\ln\frac{I}{I_0} = \alpha L C_M \tag{1a}$$

The molar extinction coefficient α in the above equation (1a) is the molar extinction coefficient when a natural logarithm of the transmittance ($I/I_0$) is used, and has a relationship of α'=0.434α with respect to the molar extinction coefficient α' (molar extinction coefficient corresponding to the absorbance Aλ) when the common logarithm of the transmittance ($I/I_0$) in the above equation (1) is used. This is because $\log_{10}e$=0.434. The following illustratively describes the molar extinction coefficient α when using the natural logarithm in ($I/I_0$) of the transmittance, it is needless to say that the same description applies to the molar extinction coefficient α' when using the common logarithmic $\log_{10}(I/I_0)$ of the transmittance.

The above molar concentration $C_M$ of acetone refers to the mass of gas per unit volume, so that $C_M$ can be expressed as $C_M$=n/V, where n is the amount of substance (mol) of the gas, i.e. the number of moles, and V is the volume (m³) of the gas. Then, since the measurement object is gas, the molar concentration $C_M$=n/V=P/RT is derived from the ideal gas law of PV=nRT, and this is substituted into the above equation (1), by applying $-\ln(I/I_0)=\ln(I_0/I)$, the following equation (2) is derived. In equation (2), R is the gas constant=0.0623 (Torr·m³/K/mol), P is the pressure (Torr) and T is the temperature (K).

[Equation 2]

$$\ln\frac{I_0}{I} = \alpha L \frac{P}{RT} \tag{2}$$

Here, the pressure that can be detected by the pressure sensor 20 is the total pressure $P_{total}$ (Torr) of the mixed gas containing acetone and the carrier gas. However, only acetone is absorbed, and the pressure P in the above equation (2) corresponds to the partial pressure $P_{ace}$ of acetone. Therefore, if the partial pressure $P_{ace}$ of acetone is expressed by the equation (2) using $P_{ace}=P_{total} \cdot C_{ace}$, which is an equation expressed by the acetone concentration $C_{ace}$ (volume %: hereinafter simply denoted as %) in the whole gas and the total pressure $P_{total}$, the relation between the concentration (%) of acetone and the absorbance considering the pressure and the temperature can be expressed by the following equation (3) using the extinction coefficient $\alpha_{ace}$ of acetone.

[Equation 3]

$$\ln\frac{I_0}{I} = \alpha_{ace} L \frac{P_{total} \cdot C_{ace}}{RT} \tag{3}$$

Also, by transforming the above equation (3), the following equation (4) is derived.

[Equation 4]

$$C_{ace} = \frac{R \cdot T}{\alpha_{ace} \cdot L \cdot P_{total}} \ln\frac{I_0}{I} \tag{4}$$

Therefore, according to the above equation (3) or (4), it is understood that the extinction coefficient $\alpha_{ace}$ corresponding to the acetone concentration (%) at the measurement light wavelength can be obtained on the basis of the respective measurement values (the gas temperature T, the total pressure $P_{total}$, and the transmitted light intensity I) when a gas having a known acetone concentration $C_{ace}$ (for example, the 100% concentration of acetone gas containing no carrier gas) is flowed.

Further, by storing the obtained extinction coefficient $\alpha_{ace}$ in the memory, the unknown concentration of the acetone concentration can be obtained by calculation based on the measured result of (T, $P_{total}$, I) according to the above equation (4). The above equations (3) and (4) are derived by applying the ideal gas law to the Lambert-Beer equation considering that the measurement object is a gas (here is acetone gas), and calculating the gas concentration (%) using the gas pressure (total pressure $P_{total}$) and the gas temperature T measurable by the pressure sensor 20 and the temperature sensor 22 of the concentration measuring device 100.

In the case where the concentration is calculated using the extinction coefficient $\alpha_{ace}$ obtained when the acetone gas of 100% concentration flows, the relation between the known concentration (set concentration) and the output concentration by the calculation may not be consistent. In this case, a correction value Jx (1 at the time of 100% concentration) for correcting the relationship between the set concentration and the output concentration may be set in advance for each concentration x %, and the linearity correction may be performed using the correction value Jx determined on the basis of the measured transmittance, and then the corrected concentration may be output.

As described above, by obtaining the extinction coefficient $\alpha_{ace}$ of acetone in advance, the acetone concentration can be calculated from the measured values (T, $P_{total}$, I). However, according to experiments conducted by the present inventors, it has been found that, even when the above equation (3) or (4) is used, errors of the concentration measurement are different due to the difference in the temperature of acetone. It should be noted that the above equation (4) is an equation taking the gas temperature T into consideration, but as a result of an experiment, it has been found that further correction is preferable in order to measure the concentration more accurately.

One of the reasons why the measurement error differs depending on the gas temperature is that the transmittance (I/I$_0$) measured according to the gas temperature of the gas differs even if the acetone gas has the same concentration.

Figure 2:
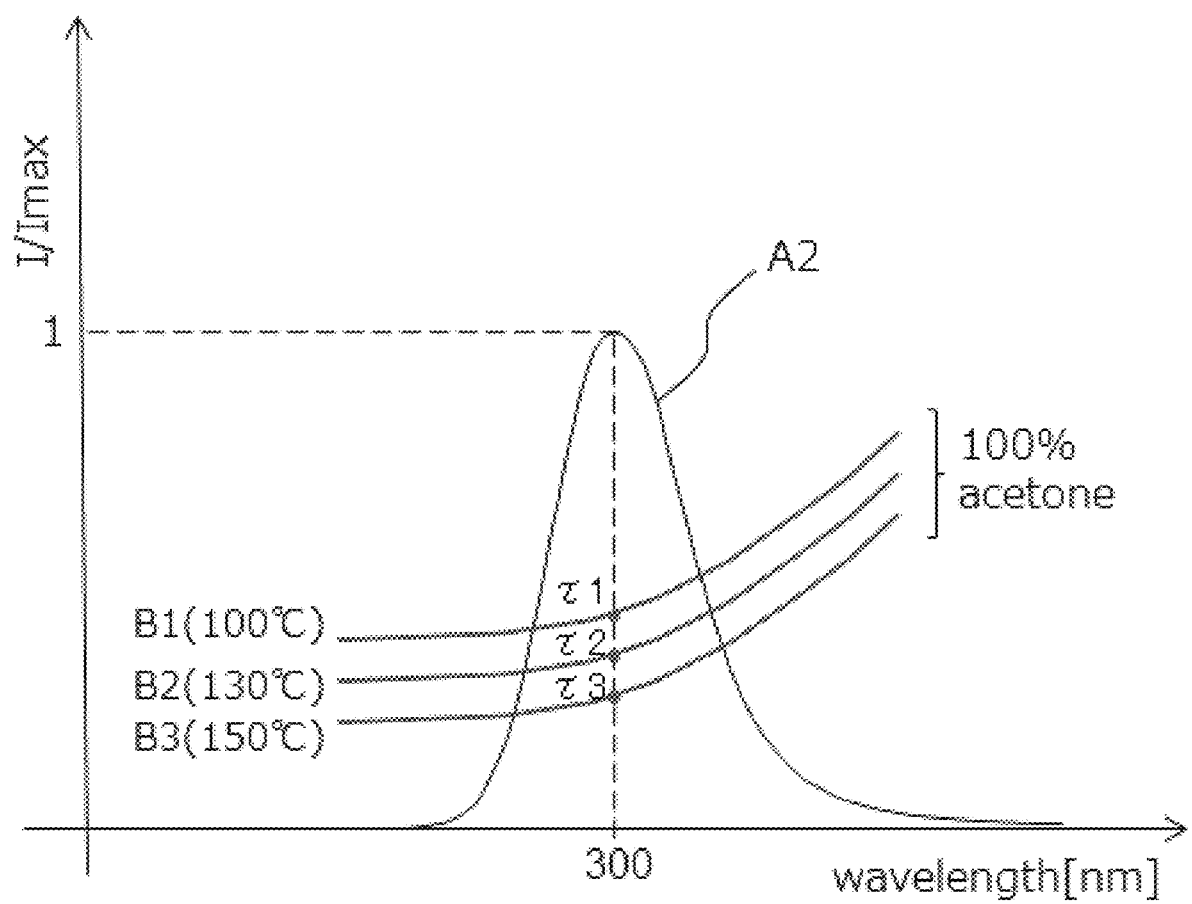
FIG. 2 is a diagram showing a spectroscopic spectrum A1 of a light-emitting element having a peak wavelength of 300 nm, and transmittance characteristics B1 to B3 when 100% acetone gas flows at 100° C., 130° C., and 150° C.

FIG. 2 is a diagram showing a difference between a spectral spectrum A2 (a spectrum of detection light when there is no absorption in the measurement cell) of a light-emitting element (LED) having a peak intensity at 300 nm and transmittance characteristics B1, B2, and B3 according to a temperature when an acetone gas of 100% concentration flows in each of them. The horizontal axis represents the wavelength (nm), and the vertical axis represents the intensity of light (more specifically, the intensity normalized by the highest intensity Imax) in the spectral spectrum A2 and the transmittance (I/I$_0$) in the transmittance characteristics B1 to B3. The transmittance characteristic B1 indicates the case where the gas temperature is 100° C., the transmittance characteristic B2 indicates the case where the gas temperature is 130° C., and the transmittance characteristic B3 indicates the case where the gas temperature is 150° C. Note that the transmittance characteristics B1 to B3 shown in FIG. 2 show, as the transmittance, the result of dividing the spectroscopic spectrum of the detection light (not shown) when acetone gas of 100% concentration flows by the spectroscopic spectrum A2 of the detection light when there is no absorption by acetone gas.

As shown in FIG. 2, the acetone gas of 100% concentration tends to have a higher transmittance characteristic B1 at 100° C. than the transmittance characteristic B2 at 130° C., which is the main gas temperature at the time of use (hereinafter, sometimes referred to as the reference temperature). The transmittance characteristic B3 at 150° C. tends to be lower than the transmittance characteristic B2. This tendency is similar to ultraviolet light of 290 to 310 nm, for example, which is supposed to be measurement light.

For this reason, even though the same 100% concentration of acetone gas flows, transmittance and absorbance may be measured as different depending on the gas temperature. More specifically, as shown in FIG. 2, in the case where measurement is performed using the light of the spectral spectrum A1 having a peak at 300 nm, although the concentration of acetone itself is constant at the same 100%, the transmittance becomes the value of τ2 when the gas temperature is 130° C., the transmittance becomes the value of τ1 when the gas temperature is 100° C., and the transmittance becomes the value of τ3 when the gas temperature is 150° C.

Therefore, when the concentration calculation is performed according to the above equation (4) using the extinction coefficient $\alpha_{ace}$ obtained when acetone gas of 100% concentration flows at 130° C., the concentration of the gas at 100° C. or 150° C. may not be accurately obtained. This is because, even at the same concentration, the ease of absorbance varies depending on the gas temperature.

In order to solve the above problem, in the present embodiment, the extinction coefficient $\alpha_{ace}$ at the respective temperature is obtained in advance and stored in the memory as a plurality of extinction coefficients $\alpha_{ace}$ associated with the temperatures, and when performing concentration measurement, the appropriate absorption coefficient $\alpha_{ace}$ is determined and used on the basis of the measured gas temperature at that time.

Figures 3, 4:
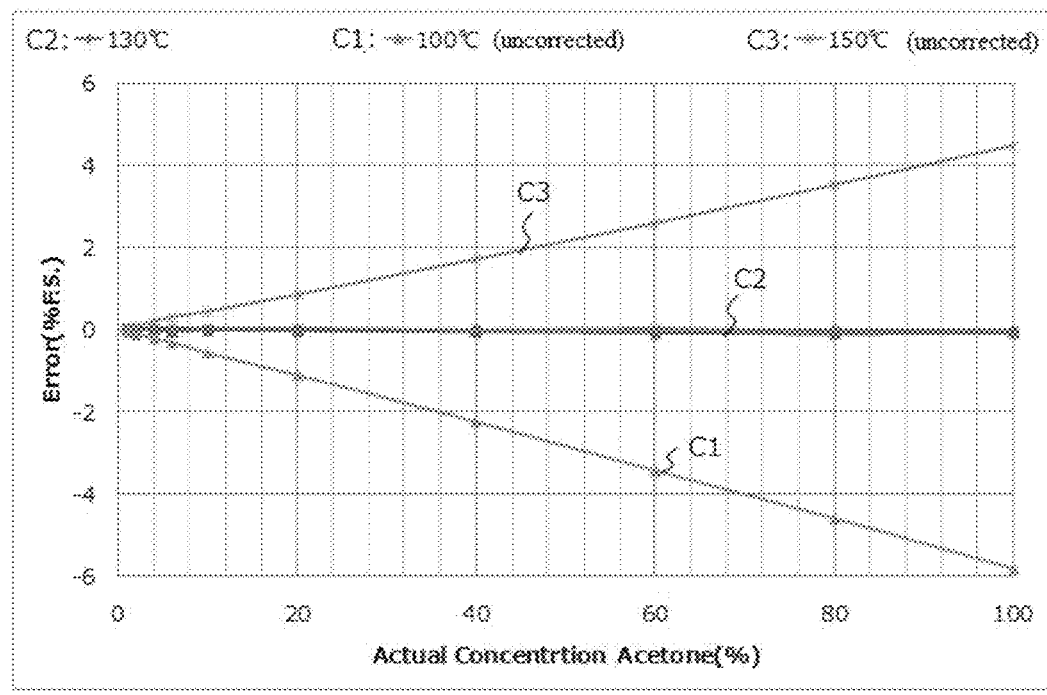
FIG. 3 is a diagram showing an error occurrence due to the gas temperature when using a constant extinction coefficient.
FIG. 4 is a table showing extinction coefficients set for each of three temperatures T1 (100° C.), T2 (130° C.), and T3 (150° C.) corresponding to the wavelength of the measurement light (300 nm).

Graphs C1 to C3 of FIG. 3 show the relationship of errors between the calculated concentration and the actual acetone concentration when the concentration of acetone gas is calculated at 100° C.(=T1), 130° C.(=T2), and 150° C.(=T3) using the extinction coefficient $\alpha_{ace, T2}$ obtained by acetone gas of 100% concentration at 130° C. The horizontal axis shows the actual acetone concentration (known set concentration), and the vertical axis shows the magnitude of the deviation from the actual acetone concentration in full scale error (%).

As shown in graph C2, when the temperature of the acetone gas is 130° C., the error between the calculated concentration when using the extinction coefficient $\alpha_{ace, T2}$, and the actual concentration becomes 0 (in other words, the extinction coefficient $\alpha_{ace, T2}$, at which the error becomes 0, is used). On the other hand, as shown in graph C1, when the acetone gas is at 100° C., an error occurs between the concentration obtained by calculation using the extinction coefficient $\alpha_{ace, T2}$ at 130° C. and the actual concentration. Similarly, as shown in graph C3, when the acetone gas is at 150° C., an error occurs between the concentration obtained by calculation using the extinction coefficient $\alpha_{ace, T2}$ at 130° C. and the actual concentration.

More specifically, since an excessive extinction coefficient $\alpha_{ace, T2}$ is used for the acetone gas at 100° C., as can be seen from Equation (4), the value smaller than the actual concentration is output as the calculated concentration. Also, an insufficient extinction coefficient $\alpha_{ace, T2}$ is used for the acetone gas at 150° C., a value larger than the actual concentration is output as the calculated concentration. Thus the errors shown in the graphs C1 and C3 occur.

The magnitude of the above error is greatest when the acetone gas of 100% concentration flows, and the error becomes 0 when the acetone gas of 0% concentration flows (i.e., no absorbance), the relationship between concentration and magnitude of error is linear. Therefore, it can be understood that calculation results with less error can be obtained for any concentration if extinction coefficients $\alpha_{ace, T1}$, $\alpha_{ace, T2}$ other than the extinction coefficient at 100% concentration at the reference temperature are also obtained in advance, and the concentration calculation of the gas in the vicinity of 100° C. and in the vicinity of 150° C. are performed by using these values.

Similar to the extinction coefficient $\alpha_{ace, T2}$, the extinction coefficients $\alpha_{ace, T1}$ and $\alpha_{ace, T3}$ can be calculated according to the equations (3) and (4) from each measured value (T, $P_{total}$, I) when 100% acetone gas flows at 100° C. and 150° C. respectively.

The table of FIG. 4 shows the extinction coefficient for each cell temperature (° C.) when the measurement light wavelength (LED peak wavelength (nm)) is 300 nm, as described above, by using the measurement light of 300 nm, the extinction coefficient $\alpha_{ace, T1}$, $\alpha_{ace, T2}$, $\alpha_{ace, T3}$ can be obtained from Equation (4) for each of the acetone gases at 100° C., 130° C., and 150° C., and all can be stored in the memory.

In the above description, the embodiment in which all the extinction coefficients at each temperature are stored in the memory has been described, but the present invention is not limited to this, and the concentration may be calculated by storing the extinction coefficient at 130° C. as the reference extinction coefficient, storing the correction coefficient at each temperature, and using the extinction coefficient multiplied by the correction coefficient determined on the basis of the measured temperature.

In addition, although the embodiment in which the extinction coefficient is determined for each of the temperatures T1, T2, and T3 has been described above, the embodiment of the present invention is not limited thereto. By using any number of two or more extinction coefficients associated with gas temperatures, concentration measurement errors that occur depending on the gas temperature may be reduced. Further, when the extinction coefficients $\alpha_{T1}$, $\alpha_{T2}$ are given for the two temperatures T1 and T2 respectively, and the measured temperature is between T1 and T2, the extinction coefficient can be obtained by substituting the measured temperature into a linear expression connecting to the orthogonal plane coordinates (T1, $\alpha_{T1}$) and (T2, $\alpha_{T2}$).

Next, an embodiment in which different extinction coefficients are set not only for the above-mentioned gas temperatures but also for the wavelengths of the measurement light will be described.

Figures 5, 6:
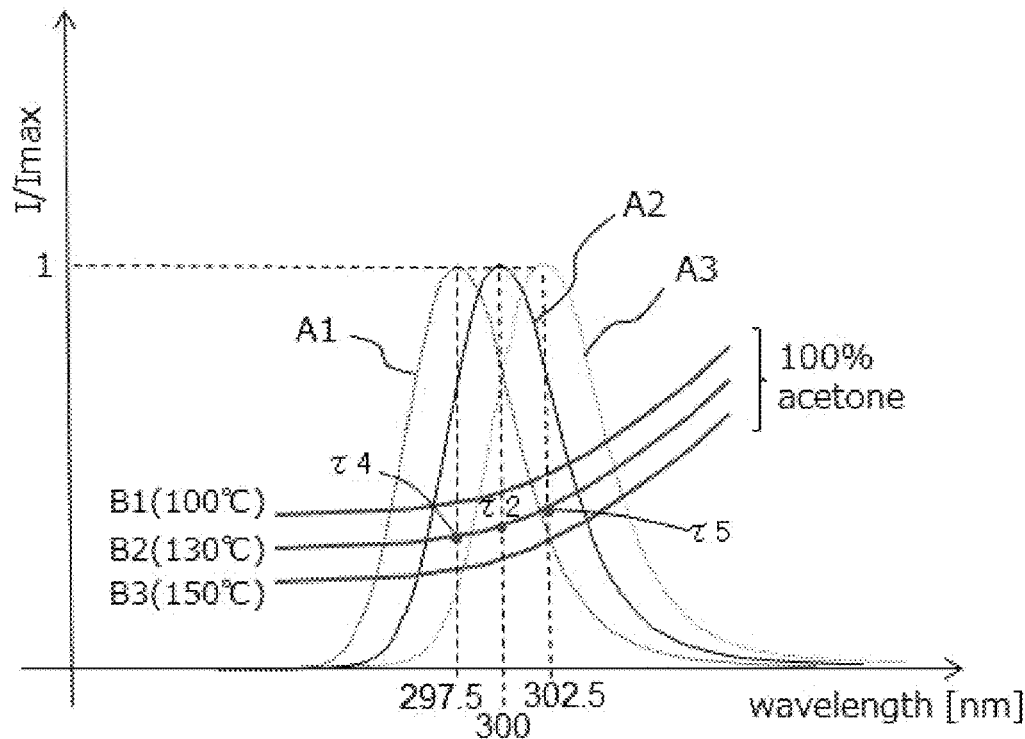
FIG. 5 is a diagram showing spectroscopic spectrums A1, A2, and A3 of the measurement light having three different peak wavelengths, and transmittance characteristics B1, B2, and B3 at each gas temperature.
FIG. 6 is a table showing nine extinction coefficients set for each of the three wavelengths L1 (297.5 nm), L2 (300 nm), and L3 (302.5 nm) of the measurement light, at the three temperatures T1 (100° C.), T2 (130° C.), and T3 (150° C.).

FIG. 5 shows the spectral spectra A1, A2, A3 of the measuring light having three different peak wavelengths, 297.5 nm, 300.0 nm, and 302.5 nm, and the transmittance characteristics B1, B2, and B3 corresponding to the temperatures. FIG. 5 is a diagram adding to FIG. 2 the difference in the spectral spectrum of the measurement light caused by the machine difference of the concentration measurement devices.

FIG. 6 is a table showing nine extinction coefficients $\alpha_{ace,\ L1,T1}$, $\alpha_{ace,\ L1,T2}$, $\alpha_{ace,\ L1,T3}$, $\alpha_{ace.\ L2,T1}$, $\alpha_{ace,\ L2,T2}$, $\alpha_{ace,\ L2,T3}$, $\alpha_{ace,\ L3,T1}$, $\alpha_{ace,\ L3,T2}$, $\alpha_{ace,\ L3,T3}$ respectively set for combinations of the temperatures T1, T2, and T3 of the gas and the wavelengths L1, L2, and L3 of the measurement light.

As shown in FIG. 5, the actual peak wavelength of the measurement light may be slightly different even for the concentration measurement device manufactured with the same design rule. This is because the peak wavelength itself of the light source (LED) is often different from the beginning. It is also conceivable that in particular the spectrum of the ultraviolet LED over time varies from the initial spectrum.

In this case, when the concentration calculation is performed by applying the initially set extinction coefficient $\alpha_{ace,\ T2}$ for the wavelength of 300 nm to the measurement results when the measurement light of different wavelengths (here, 297.5 nm and 302.5 nm) are used, an error may occur in the calculated concentration. This is because, as in the case of the above temperature, even though the acetone gas has the same 100% concentration, the transmittance becomes different depending on the measurement light wavelength. Specifically, as shown in FIG. 5, even in the case where the acetone gas has the same 100% concentration and at 130° C., the transmittance becomes τ2 when the measured light peak wavelength is 300 nm, the value of τ4 at 297.5 nm, and the value of τ5 at 302.5 nm.

Therefore, as shown in FIG. 6, by previously setting and storing nine matrix-shaped extinction coefficients determined on the basis of the temperatures T1, T2, T3 and the wavelengths L1, L2, L3 in the memory, it is possible to perform more accurate concentration measurement in each case. Of course, more than 9 extinction coefficients may be set, or when a value between the extinction coefficients described in the matrix is observed, the closest extinction coefficient may be selected, or the appropriate extinction coefficient may be determined by performing a correction on the matrix value.

As described above, by using different extinction coefficients for the wavelengths L1, L2, and L3 respectively, the concentration can be measured regardless of the difference in the wavelength of the measurement light due to machine difference. By performing a step of detecting the peak of the measurement light wavelength prior to concentration measurement, the concentration measurement device can determine the extinction coefficient to be used in the device.

Further, although the concentration measurement using acetone gas has been described above, it is also the same for other types of gases, the accuracy of the concentration measurement can be improved by setting a plurality of extinction coefficients associated with the temperature or the measurement light wavelength in advance. In the case of measuring the concentration of another type of gas, the extinction coefficient may be set in advance as described above, but the extinction coefficient for the acetone gas may be stored in the memory, and the extinction coefficient for the gas type may be determined by correcting the extinction coefficient according to the type of gas.

Figure 7:
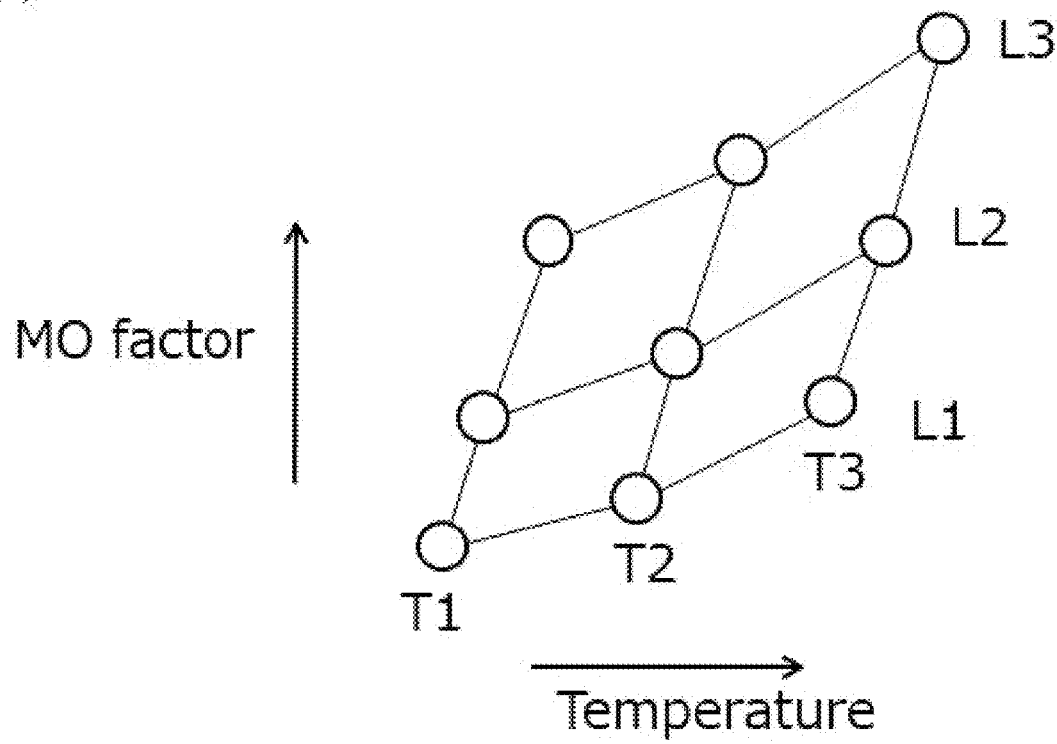
FIG. 7($a$) is a table showing correction factors (MO factors) set for each wavelength and temperature of the measurement light, and FIG. 7($b$) is a diagram showing an example of a tendency of the correction factors.

FIG. 7 (a) is a diagram showing a matrix of correction factors, corresponding to the matrix of the extinction coefficient of the acetone gas shown in FIG. 6. As shown in FIG. 7(a), nine correction factors (hereinafter, sometimes referred to as MO factors) corresponding to combinations of three temperatures and three measurement light wavelengths are set for the nine extinction coefficients of the acetone gas stored in the memory. Each correction factor can be obtained by dividing the extinction coefficient measured for the measurement gas by the extinction coefficient of the acetone gas. As described above, by storing 9 extinction coefficients of the acetone gas as the extinction coefficient of the reference gas (here, acetone gas) in the memory, and setting the correction matrix for each type of the measurement gas (here, organometallic (MO) gas), the concentration measurement can be performed more accurately corresponding to various gases. In addition, the concentration measurement error caused by the design of the optical system of the concentration measurement device, etc. can be pre-calibrated before shipment, etc., in the process of obtaining the extinction coefficient using the reference gas, error due to the machine error when measuring the concentration of the measurement gas after shipment can be suppressed.

FIG. 7(b) is a diagram showing an example of the relationship between the MO factor (correction factor), the temperature and the measurement light wavelength. In the example shown in FIG. 7(b), the higher the temperature, the bigger the correction factor, the longer the measurement light wavelength, the bigger the correction factor. Such a tendency is shown when a correction factor is obtained with respect to a gas having a transmittance characteristic similar to that of the acetone gas shown in FIG. 2. However, it can be said that other tendencies may be exhibited for gases having different transmittance characteristics.

While the concentration measurement device according to the embodiment of the present invention has been described above, the present invention is not limited to the above embodiments, and variations can be made without departing from the spirit of the present invention. For example, as the measurement light, in correspondence to the type of the gas, a light in a wavelength region other than the ultraviolet region can be used.

Further, the reflection-type concentration measurement device using a reflecting member has been described above, a transmission-type concentration measurement device without using a reflecting member, configured so that incident light comes from one end of the measurement cell, and the measurement light is taken out of the other end of the measurement cell.

INDUSTRIAL APPLICABILITY

The concentration measurement device according to the embodiment of the present invention is used for semiconductor manufacturing equipment or the like and is suitably utilized for measuring the concentration of various gases.

DESCRIPTION OF NUMERALS

1 Light source
2 Cell main body
3 Window portion
4 Measurement cell
4a Inlet
4b Outlet
4c Flow path
5 Reflective member
6 Collimator
7 Photodetector
8 Arithmetic circuit
9 Reference photodetector
10a Optical fiber (for incident light)
10b Optical fiber (for emitted light)
20 Pressure sensor
22 Temperature sensor
50A Gas unit
50B Electrical unit
100 Concentration measurement device

What is claimed is:

1. A concentration measurement device comprising:
a measurement cell having a flow path through which a gas flows;
a light source for generating incident light to the measurement cell;
a photodetector for detecting light emitted from the measurement cell;
a pressure sensor for detecting a gas pressure in the measurement cell;
a temperature sensor for detecting a gas temperature in the measurement cell; and
an arithmetic circuit for calculating a concentration of the gas based on an output of the pressure sensor, an output of the temperature sensor, an output of the photodetector, and a plurality of extinction coefficients stored in advance in a memory,
wherein the arithmetic circuit is configured to calculate the concentration using an extinction coefficient determined from the plurality of extinction coefficients based on the output of the temperature sensor, and configured to calculate the concentration by using a correction factor set for each type of gas to correct the extinction coefficient of a reference gas.

2. The concentration measurement device according to claim 1, wherein the arithmetic circuit is configured to calculate the concentration using an extinction coefficient determined on the basis of the output of the temperature sensor and a peak wavelength of a measurement light emitted from the light source.

3. The concentration measurement device according to claim 2 configured to calculate the concentration by using any one of nine extinction coefficients corresponding to a combination of three temperatures and three peak wavelengths of the measurement light.

4. The concentration measurement device according to claim 1, wherein the arithmetic circuit is configured to determine the concentration C of the gas using a determined extinction coefficient $\alpha$ according to the following equation, $$C = \ln(I_0/I) \times (R \cdot T)/(\alpha \cdot L \cdot P)$$

where $I_0$ is an intensity of the incident light to the measuring cell, I is an intensity of light passing through the measuring cell, R is a gas constant, T is a gas temperature in the measurement cell, L is an optical path length of the measurement cell, and P is a gas pressure in the measurement cell.

5. The concentration measurement device according to claim 1, wherein the reference gas is acetone gas.

* * * * *